United States Patent [19]

Staples

[11] 4,309,417

[45] Jan. 5, 1982

[54] PROTEIN FORTIFIED ISOTONIC BEVERAGES

[75] Inventor: Lorna C. Staples, Teaneck, N.J.

[73] Assignee: Stauffer Chemical Company, Westport, Conn.

[21] Appl. No.: 168,220

[22] Filed: Jul. 10, 1980

[51] Int. Cl.$^3$ ..................... A61K 33/42; A61K 37/00
[52] U.S. Cl. .................................. 424/128; 424/153; 424/177; 426/583; 426/590; 426/648
[58] Field of Search .................. 424/127, 128, 153; 426/583, 648, 590

[56] References Cited

U.S. PATENT DOCUMENTS 3,821,368  6/1974  Reynolds ........................... 424/153
3,949,098  4/1976  Bangert .............................. 426/583
4,200,662  4/1980  Scibelli .............................. 426/583

OTHER PUBLICATIONS

Holsinger et al., Food Technology, Feb. 1973, pp. 59-65.
Balakian, Medical Times, vol. 99, No. 9 (Sep. 1971), pp. 207, 208 & 209.

Primary Examiner—Sam Rosen
Attorney, Agent, or Firm—Paul J. Juettner

[57] ABSTRACT

A beverage comprising sodium ions, a sweetener and a protein which in liquid form provides from about 10 to about 50 milliequivalents/liter sodium ions, from about 0.25% to about 10% by weight protein and an osmolarity of from about 140 to about 375 mOs/kg. The preferred protein is derived from whey protein concentrate and most of the electrolytes needed in the beverage are provided by the whey protein concentrate.

5 Claims, No Drawings

PROTEIN FORTIFIED ISOTONIC BEVERAGES

The present invention relates to new beverage compositions adapted to rapidly replace body fluids and electrolytes (salts) as well as any protein expended during periods of strenuous activity.

It is well known that water and some currently available flavored beverages do not quickly replace water and salts lost during strenuous activity. Water is not rapidly absorbed into the blood stream from the gastrointestinal tract. Water can cause cramps and nausea. Most currently available flavored beverages do not contain the necessary salts needed to replace the salts lost during strenuous work or activity, nor are they adapted in rapidly replacing fluids.

Various beverages have been formulated which have, as their object, the speedy replacement of salts and fluids lost during activity. These beverages generally contain sodium ions, potassium ions, chloride ions, phosphate ions, sugars and flavors. Beverages of this type are disclosed in Canadian Patent No. 896,486 and British Patent Nos. 1,541,461 and 1,252,781.

An important characteristic of the beverages is the tonicity or the osmolarity of the beverages. Tonicity is a measure of the osmotic pressure of a solution relative to the osmotic pressure of the blood fluids. An isotonic solution is a solution of the same tonicity or osmotic pressure as a normal saline solution and, therefore, of the same tonicity as blood serum. A hypertonic solution is a solution of greater tonicity than an isotonic solution whereas the hypotonic solution is a solution of lower tonicity. British Patent No. 1,541,461 indicates that hypotonic beverages with an osmolarity of from 80 to about 200 mOs/kg are most effective for replacing bodily fluids. Canadian Patent No. 896,486 claims a beverage with an osmolarity of 140–440 mOs/kg. This covers the range of hypo (80–200 mOs/kg), iso (201–300 mOs/kg) and hypertonic (301–440 mOs/kg) beverages. A solution that has 1/1000 of an osmol dissolved per kilogram has a concentration of 1 milliosmol per kilogram. An osmol is the number of particles in 1 gram molecular weight of undissociated solute.

It is also known that carbohydrates are the primary fuel for muscular exercise in man. Proteins and fats are indirect fuels. Protein either supplies amino acids for tissue synthesis or supplies fuel for energy requiring processes during periods of nitrogen acquisition. If carbohydrates are not available in foods, the fuel must be made by the body from those materials which are in the diet. The great demand for fuel accompanying muscular exercise may rapidly exhaust carbohydrate stores evidenced by a decrease in glycogen in liver and muscles. If exercise is sufficiently severe and prolonged, abnormal lowering of the blood-sugar level may result. These phenomena are accompanied by increased breakdown of body protein (excreted as nitrogen in the urine). See Clinical Nutrition, edited by N. Jolliffe, M. D. et al. Paul B. Hoeber, Inc. (1950) at pages 215 and 216. Amino acids are lost in sweat. With exertion and long-continued sweat volume, amino acid loss may be significant, particularly if proteins of poor biological quality are consumed and if adaptation to climate does not reduce loss. Modern Nutrition in Health and Disease, M. Wohl et al., Lea E. Febiger -Philadelphia, 1955, at page 963.

The hypotonic and isotonic beverage systems of the prior art are concerned solely with the replacement of salts lost through evaporation and sugars used as fuel during strenuous activity. The hypotonic and isotonic beverages presently available are, additionally, known to suffer from poor taste. None of these beverages replace protein used for energy rather than tissue building during the activity.

SUMMARY OF THE INVENTION

In accordance with the present invention, a beverage composition is provided comprising sodium ions, a sweetener and a protein, said composition when dissolved in a liquid providing a fluid having from about 10 to about 50 milliequivalents/liter sodium ion, from about 0.25% to about 10% by weight protein, and an osmolarity of from about 140 to about 375 mOs/kg. The beverages of the invention provide the proper osmolarity for the rapid replenishment of fluids and electrolytes lost during strenuous activity as well as providing protein diverted from tissue formation while improving the palatibility of the beverage.

DETAILED DESCRIPTION OF THE PRESENT INVENTION

The important aspect of the present invention is maintaining the osmolarity of the beverage within the range of from about 140 to about 375 mOs/kg in order to provide solutions which will rapidly empty from the stomach into the blood stream to provide needed electrolytes and fluid (water) to the system. A preferred osmolarity ranges from about 201 to about 300 mOs/kg. These osmolarities can be obtained by controlling the ratio of ingredients and specifically the amount of electrolytes that are included in the beverages of the invention. Control of osmolarity is also obtained by limiting the amount of sweetening agents added to such mixtures.

The sodium ions are advantageously provided by using a non-toxic readily available sodium salt, such as the chloride, carbonate, bicarbonate, citrate, phosphate, hydrogen phosphate, tartrate, benzoate and the like or a combination thereof. The sodium ion is preferably present in an amount in the range of from about 10 to about 35 and preferably from about 20 to about 30 milliequivalents per liter. The beverage composition of the present invention can also contain potassium ions, advantageously obtained from a suitable salt such as the chloride, bicarbonate, citrate, phosphate, hydrogen phosphate, tartrate, sorbate and the like or a combination thereof. The potassium ion is preferably present in an amount ranging from about 0.5 to about 20 and preferably from about 5 to about 10 milliequivalents per liter.

It is also preferred that chloride ions are present in an amount ranging from about 10 to about 35 milliequivalents per liter. The chloride ions can be provided by any non-toxic water soluble salt such as sodium chloride and potassium chloride. It is also preferred that phosphate ions in the range of from about one to about 28 milliequivalents per liter be present. These can be appropriately added utilizing any non-toxic water soluble salt such as the alkali metal phosphates.

The amount of these ions is based on those present in the final beverage. Thus, the ions can be added as part of a sweetening system, a preservative system, a color system and the like. These ions can also be added as part of the protein system to be discussed hereinafter. It is important that the amount of electrolyte be controlled since too much sodium ion may cause the beverage to have a salty taste and cause stomach irritation. Too much chloride ion or phosphate ion in the beverage can result in flavor problems.

The sweetening agents which can be utilized in the present invention include both the natural and artificial sweeteners. The natural sweeteners include sugar, such as glucose, sucrose, lactose, and maltose. The total concentration of the natural sweeteners should range from one to about 75 grams per liter since greater amounts may have an effect on osmolarity. Part of the natural sweetening agents can be replaced by artificial sweetening agents such as saccharins, such as sodium or calcium saccharin, cyclamates such as sodium or calcium cyclamate, dipeptides such as aspartylphenylalanine, methyl ester or hexamic acid. Generally, part of the natural sweetening agents can be substituted with sodium or calcium saccharin to provide the desired sweetness without adversely affecting the osmolarity, although use of too much of the artificial sweetening agents may cause flavor problems. The artificial sweetening agents are generally present in amounts equal to from about 0 and preferably from about 0.01 to about 0.6 grams per liter. The amount of sweeteners either natural, artificial or both depends on the sweetness and osmolarity desired.

Other components which can be present in the beverages of the invention include such ingredients as normally found in such beverages including acids to develop flavor and adjust pH. While the beverage can have any pH, it is preferred that the pH range from about 3 to about 7 and more preferably from about 3 to about 3.7. Acidic pH's below 3 could have an effect on the stability of the protein in a bottled beverage. Liquid beverages can be acidified with organic or mineral acids, preferably fumaric and/or phosphoric. Dry powder beverages generally use organic acids. The following acids are illustrative of compatible acids which can be used in the invention: citric, phosphoric, lactic, adipic, tartaric, hexamic, fumaric, malic and the like. Fruit acid such as citric and the like, and phosphoric acids are the preferred acids. The acids are generally used in an amount ranging from about 0 to about 3.3 grams per liter. Salts of the acid can also be used such as sodium citrate. Ascorbic acid or salts have been used to provide a source of vitamin C. Suitable flavoring agents which can be used in the invention include cola, lemon, lime, lemon-lime, cherry, punch, orange, grape, root beer, strawberry and the like. These can be included by means of an artificial or natural flavor system. The flavoring agents are generally present in amounts of at least 0.02% by weight or above on a weight basis of the liquid beverage and can be varied to suite individual taste.

Coloring agents can also be incorporated into the beverage compositions of the invention. The type of coloring agent used is not critical as long as it is not toxic and approved for food use. If a beverage of turbid or cloudy appearance is desired clouding agents may also be incorporated in the beverage compositions.

Preservatives such as sodium benzoate and/or potassium sorbate can also be used. Levels of from about 0.01 to about 1% by weight of the liquid beverage are generally preferred. In carbonated beverages, for example, sodium benzoate is preferred. In noncarbonated beverages, potassium sorbate is generally preferred.

Sequestering agents such as ethylenediamine-tetraacetic acid and its salts such as the sodium, calcium salts may also be used for maintaining flavor and color. Generally, preferred amounts are from about 5 to about 500 parts per million, depending on the water supply used, the hardness of the water, and the metal content. Usually from about 30 to about 50 ppm. is adequate in good potable water.

The protein can be derived from any animal (mammal, cold-blooded aquatic, and poultry) or plant source. Preferably, the protein is partially water soluble at the pH of the beverage and more preferably the protein is substantially water soluble, i.e., greater than 90% by weight (based on the weight of the protein). Preferably the animal source is beef, swine, sheep and poultry. The protein can be an isolate from the muscle or organ portion of the animal, the blood fluid or the lacteal fluid. The protein can also be isolated from poultry eggs. The plant proteins which can be used can be obtained from any grain such as wheat, leaf protein such as alfalfa or legume source. These are illustrated by soy whey concentrate and soy whey. Preferably, the animal protein is obtained from the blood or lacteal fluid of mammals or the poultry eggs. More preferably, the protein is isolated from chicken eggs and the lacteal fluid of beef. Most preferably, the protein is an albumin protein from the lacteal fluid, egg white or blood fluid. Of these the more preferred is partially soluble proteins obtained from lacteal fluids. Illustrative of the lacteal fluid is milk, defatted milk, non-fat dried milk, casein and its alkali metal or alkaline earth metal salts (sodium preferred, potassium and calcium), whey, whey protein concentrate, modified whey products, delactosed whey, whey byproducts from the isolation of whey protein from whey and the like. The most preferred material for use in the present invention is whey protein concentrate and the remainder of the invention will generally be discussed in connection with the specific material though the disclosure is applicable to all disclosed proteins.

The whey protein concentrates used in the invention can be prepared by various physical techniques including molecular sieve fractionation (U.S. Pat. No. Re. 27,806), Ultrafiltration (Horton, B. S. et al., Food Technology, Vol. 26, p. 30, 1972), Reverse Osmosis ("Fractionation and Concentration of Whey by Reverse Osmosis" by Marshall, P. G., Dunkley, W. L. and Lowe, E., Food Technology, Vol. 22 (a), pp. 969-1968), Dialysis and Electrodialysis (Desalting by Electrodialysis, by Friedlander, H. Z., and Rickles, R. W., Chem. Engineering, May 23, 1966, p. 153) and the like. The preferred technique is ultrafiltration (discussed more fully hereinafter). The protein can also be chemically separated such as by the use of phosphate (U.S. Pat. Nos. 2,377,624 and 4,043,990) or sodium lauryl sulfate precipitation (U.S. Pat. Nos. 4,029,825 and 4,058,510). A whey protein concentrate is defined as a product which has been treated in such a way to increase the protein content of the dry product from its normal content of about 11% to an increased level of about 25% protein based on total Kjeldahl nitrogen. Products having protein content ranging from about 25% to about 95%, preferably from about 35% to about 75% and more preferably from about 40% to about 60% can be obtained.

The raw cheese whey source used in preparing the whey protein concentrates used in the invention can be acid cheese whey, sweet cheese whey, or mixtures thereof. More particularly, the raw cheese whey can be cottage cheese whey, casein whey, cheddar cheese whey, mozzarella cheese whey, Swiss cheese whey or mixtures thereof. Preferably, raw cheese whey used in connection with the molecular sieve fractionation is a blend of cottage cheese whey and cheddar cheese whey. The preferred cheese whey for use in the ultrafiltration fractionation of whey is acid cheese whey.

Effective in the invention is the whey protein concentrate obtained from the ultrafiltration of cheese whey. Ultrafiltration membranes are utilized to separate the high molecular weight fraction of the whey (the protein) from the liquid and low molecular materials, i.e., the lactose and ash in the whey solution. A representative membrane cut off limit is about 20,000 molecular weight. The protein enriched solution is retained on the membrane and it is called the retentate. The water and low molecular weight fraction passes through the membrane and is called the permeate.

In an illustrative method for ultrafiltering cheese whey, an acid or cottage cheese whey concentrate containing from about 40% to about 60% and preferably 50% ±5% whey protein is prepared by neutralizing acid whey to a pH of 6.5 with caustic. After storage, the pH is then adjusted to 7.2 and any solids or precipitates are removed by centrifugal clarification. The clarified liquor is then pasteurized and fed into the ultrafiltration membrane unit. The retentate is condensed and spray dried.

The beverages of the invention can also contain certain dried deproteinized whey byproduct solutions in addition to the water-soluble proteins described above. These byproduct solutions can be derived from either acid or sweet cheese whey which has been processed to remove all or a part of the protein content thereof. As used herein, the term "whey byproducts" is particularly intended to include the second fraction obtained from the molecular sieve separation of cheese whey as described in U.S. Pat. No. Re. 27,806, the permeate obtained from the ultrafiltration concentration of protein from whey, and delactosed permeate.

The low molecular weight second fraction is the material obtained by passing a partially delactosed cheese whey mother liquor through a bed of molecular sieve resin in accordance with U.S. Pat. No. Re. 27,806 and recovering, for the purposes of this invention, the low molecular weight second fraction containing mainly lactose, minerals and residual protein of the following approximate composition:

| | |
|---|---|
| Lactose, % | 40–50 |
| Minerals, % | 25–35 |
| Protein (N × 6.38), % | 15–20 |
| Lactic Acid, % | 7–10 |
| Citric Acid, % | 3–6 |
| Fat, % | less than 1 |
| Moisture | less than 5 |
| pH | 6.6–7.2 |

The solids in the permeate from the ultrafiltration concentration of the protein in whey can be described more particularly by the following typical chemical analysis.

| | |
|---|---|
| Lactose, % | 70–80 |
| Minerals, % | 10–15 |
| Protein, (N × 6.38), % | 4–8 |
| Lactic Acid, % | — |
| Citric Acid, % | — |
| Fat, % | less than 1 |
| Moisture | less than 5 |
| pH | 6–7 |

After removing the lactose by normal lactose crystallization procedures, the now delactosed permeate (DLP) contains about 40–45% lactose, about 25–35% ash and about 8–12% protein (TKN × 6.38). If desired, the dairy whey used in preparing the whey protein concentrates and the byproducts can be pretreated to clarify the whey using processes such as illustrated by that disclosed in U.S. Pat. No. 3,560,219. In accordance with this patent, lipid is removed as a precipitate from whey by treating the whey solution with calcium ion at approximately a neutral pH. Acid whey containing blends can be clarified by elevating the pH to neutral as disclosed in U.S. Pat. No. 4,036,999. These byproducts can be used as liquids or dried by means of a drying adjuvant such as starch.

The byproducts can be used alone to prepare the beverage compositions of the invention if only a small amount of protein is desired. Because of the high salt content of the byproducts, the use of a sufficient amount to provide more protein would provide a beverage with too high an osmolarity.

Since the amount and type of ions is important, reagents used in processing the whey can be selected to provide a proper elemental balance such as by using potassium hydroxide in place of sodium hydroxide. The protein product can be treated to remove or reduce the level of salts, such as by electrodialysis, to provide a protein product with the proper elemental balance. Since the amounts of salts required in the beverage are known, the method for preparing the whey protein concentrate can be specifically adapted to prepare a product with ranges of salts in the proper ratios. For instance, a whey protein concentrate having about 60% protein can be prepared by ultrafiltration. Lactose can then be added to reduce the protein content to about 50%. This has the effect of reducing the ash level in the whey protein concentrate. A low ash product is more stable to pasteurization of liquid beverages.

As used herein, the term "protein" is intended to cover nitrogen compounds determined as protein by the Kjeldahl method. Thus, peptides and amino acids are included in the term "protein". Protein is intended to include protein salts (caseinates), protein hydrolyzates and protein compositions wherein some of the protein is non-protein nitrogen. A protein system can be a blend of 2 or more proteins from the same or different sources. A protein composition can be fortified such as by combining a highly purified protein source with an impure protein source.

The protein material is used in an amount sufficient to provide from about 0.25% to about 10% protein based on total Kjeldahl nitrogen and the liquid weight of the beverage. Preferably, the protein is used in an amount ranging from about 1% to about 3%.

In choosing the amounts and types of any of the above ingredients, it is to be kept in mind that these must be balanced to provide the desired osmolarity to be achieved. For example, the amount of sweetening agent must be limited and yet sufficient to provide a pleasant tasting drink in order to encourage its use. If excess chloride and phosphate ion is utilized, flavor problems may result requiring additional sweetening agents which may adversely affect the osmolarity. The selection of a type of protein is also greatly dependent upon the other materials since the protein system can also contribute salts. Therefore, the amounts of required components of the mixtures of the present invention must be carefully maintained within the above limits to achieve the desired results.

Compositions of this invention can be prepared either as finished still or carbonated beverages or in various concentrate forms such as syrups, powders, dissolvable still or effervescent tablets (with bicarbonate), chewable tablets and the like. When such concentrates and/or tablets are diluted and taken with a suitable amount of carbonated or noncarbonated water, or other such aqueous fluids as tea, coffee and the like, they provide the same advantages and benefits as do carbonated and noncarbonated liquid compositions. The compositions can also be mixed with various fruit juices, punches and the like.

If the beverage is provided as a liquid, it can be pasteurized as needed. It is noted that certain flavor systems contain ingredients harmful to the stability of the protein containing beverage. For instance, some flavoring systems contain gum arabic which has been found to react immediately with the protein after pasteurizing or within 24 hours in a cold pack beverage causing precipitation of protein. Use of materials which can cause undesirable instability problems in the beverage as prepared should be avoided.

The mixtures of the present invention can be prepared by conventional mixing and blending techniques utilizing standard equipment. Components are milled to a suitable size and then mixed and blended in required amounts to form the mixtures which can be reconstituted with water or other fluid as desired. Separate ingredients can be mixed into liquid systems to facilitate dissolving.

The invention is exemplified further in the example which follows.

EXAMPLE 1

Isotonic beverages were prepared from the following formulations:

|  | % by weight | |
|---|---|---|
|  | A | B |
| Whey protein concentrate* | 3.000 | 3.000 |
| Sucrose | 4.900 | 4.900 |
| Corn syrup solids (24D.E) | 0.200 | 0.200 |
| Natural orange flavor | 0.043 | 0.450 |
| Natural and artificial orange juice flavor | 0.005 | — |
| Fumaric acid (cold water soluble) | — | 0.030 |
| NaCl | 0.019 | 0.019 |
| Water | 91.833 | 91.401 |
|  | 100.000 | 100.000 |

*(50% protein product prepared by ultrafiltering to 60% protein an acid whey filtered to remove precipitate which has been formed by neutralizing with caustic and back blending with lactose to 50% protein).

The beverage was prepared by mixing together all of the dry ingredients. The mix was dissolved in the water and agitated with a mechanical stirrer until all of the dry ingredients had gone into solution. After adjusting the pH to 3.5 with 85% $H_3PO_4$, the beverage was bottled, capped and pasteurized at 75° C. for 20 minutes, the following nutritional information on a per serving basis for the beverage is as follows:

| Serving size 240 milliliters | | | |
|---|---|---|---|
| Calories | 72 | Sodium | 130 milligrams |
| Protein | 3.9 grams | Potassium | 70 milligrams |

The beverage A prepared as above evidences an osmolarity of 276 mOs/kg. The beverages are stable in liquid form with no protein precipitation. Beverage B would be expected to have the same osmolarity and stability.

As can be seen from the foregoing data, a stable protein fortified isotonic beverage can be prepared from a whey protein concentrate. It is particularly stressed that most of the electrolytes needed in the beverage are provided by the whey protein concentrate.

The invention is defined in the claims which follow.

What is claimed is:

1. An isotonic beverage composition comprising from about 10 to about 50 milliequivalents/liter sodium ion, from about 0.5 to about 20 milliequivalents/liter potassium ion, from about 10 to about 35 milliequivalents/liter chloride ion, from about 1 to about 28 milliequivalents/liter phosphate ion, from about 1 to about 75 grams per liter of natural sweetener, from about 0 to about 0.6 grams per liter of artificial sweetener and from about 1% to about 3% of a whey protein concentrate prepared by ultrafiltration and having from about 40% to about 60% protein, wherein most of the electrolytes are provided by said whey protein concentrate, and said composition having an osmolarity of from about 140 to about 375 mOs/kg.

2. The composition as recited in claim 1 wherein said sodium ions are present in amounts ranging from about 20 to about 30 milliequivalents/liter.

3. The composition as recited in claim 1 wherein said potassium ions are present in amounts ranging from about 5 to about 10 milliequivalents/liter.

4. The beverage as recited in claim 1 wherein the pH of the beverage ranges from about 3 to about 7.

5. The beverage as recited in claim 4 wherein the pH of the beverage ranges from about 3 to about 3.7.

* * * * *